Nov. 26, 1963 H. L. PHILLIPS ETAL 3,112,164
METHOD OF MAKING MOLD FOR BLANK FORMING DIES
Filed April 25, 1960 2 Sheets-Sheet 1
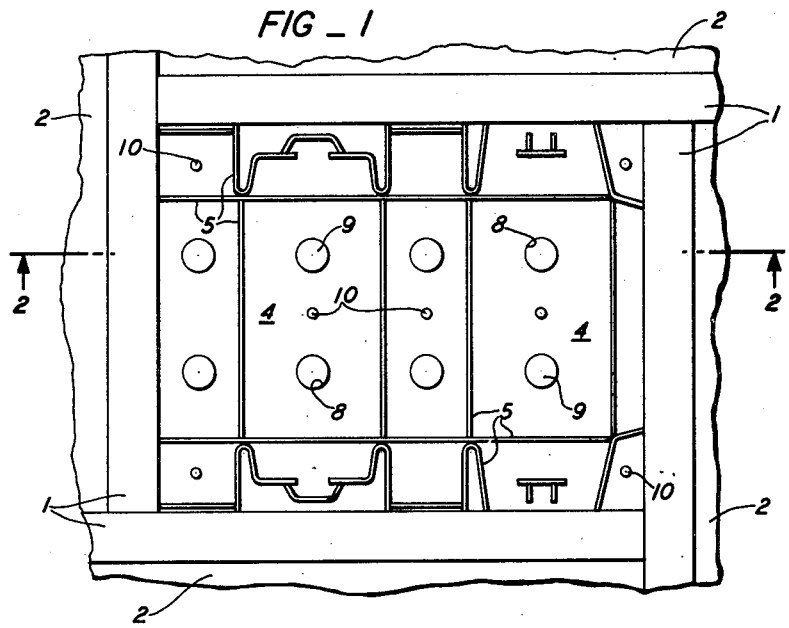
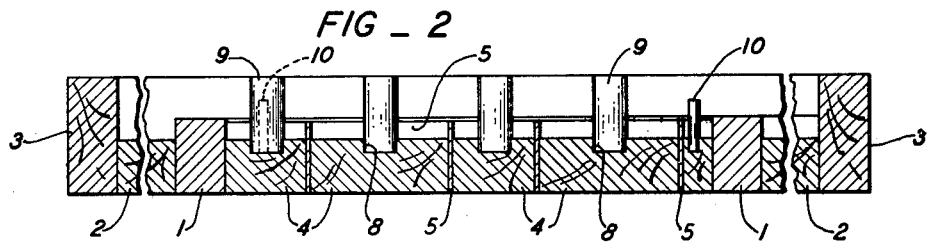
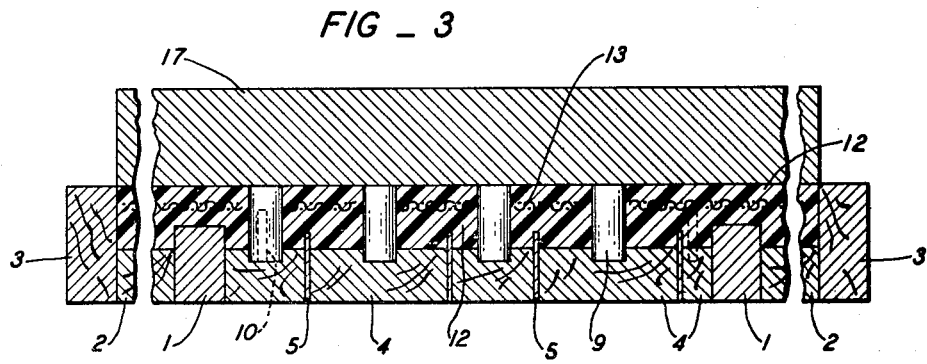
INVENTOR.
HARRY L. PHILLIPS
LYTTON S. FAIN
BY
ATTORNEYS Nov. 26, 1963    H. L. PHILLIPS ETAL    3,112,164
METHOD OF MAKING MOLD FOR BLANK FORMING DIES
Filed April 25, 1960    2 Sheets-Sheet 2
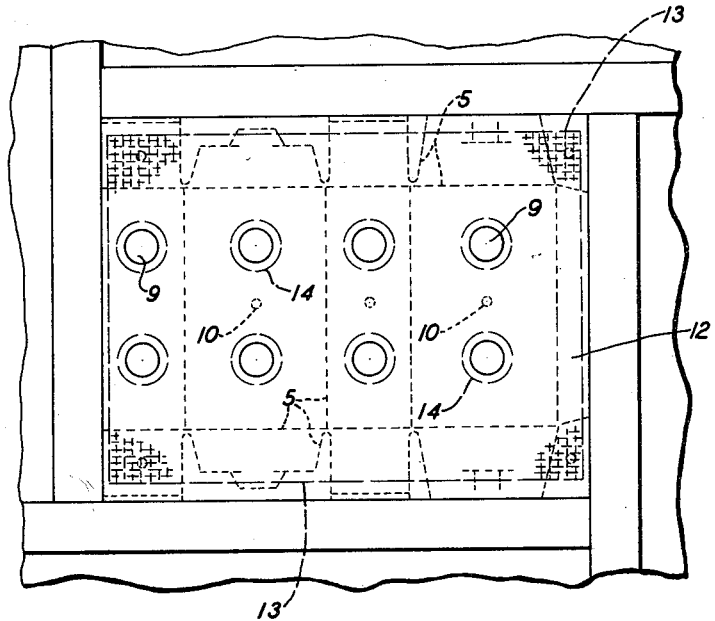
FIG_4
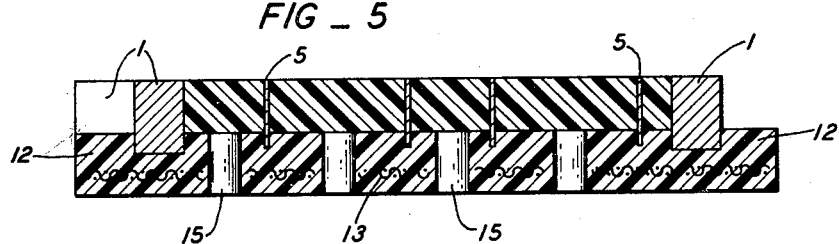
FIG_5
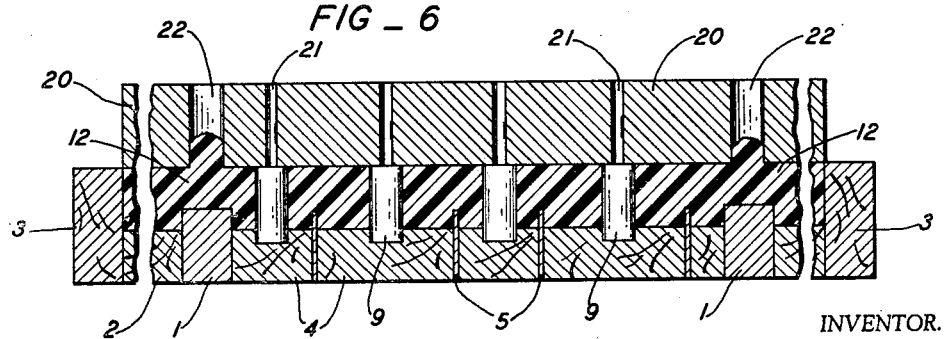
FIG_6
INVENTOR.
HARRY L. PHILLIPS
LYTTON S. FAIN
By Boyken, Mohler + Wood
ATTORNEYS US Patent Office 3,112,164
Patented Nov. 26, 1963

3,112,164
METHOD OF MAKING MOLD FOR BLANK FORMING DIES
Harry L. Phillips, San Francisco, and Lytton S. Fain, San Leandro, Calif., assignors to Floseal Corporation, San Francisco, Calif.
Filed Apr. 25, 1960, Ser. No. 24,273
5 Claims. (Cl. 18—59)

This invention relates to a mold for use in making blank forming dies, such as are employed for forming cardboard carton blanks, and blanks from other sheet materials and is a continuation in part of application Serial No. 754,632, filed August 12, 1958, and Serial No. 9,545, filed February 18, 1960.

One of the objects of this invention is the provision of an improved method of making an accurate plastic compound mold from a wooden furniture die, which mold is adapted to be employed for reproducing the essentials of the wooden furniture die in a hardened plastic compound.

Wooden furniture dies for use in stamping carton blanks from cardboard, are old. Essentially they consist of steel rules having cutting and creasing edges defining the outline, and the folding creases, and other cuts to be made in a blank. Usually some of these rules may be straight, while others are bent. Wooden blocks are cut to fit between and against the rules for supporting the latter, and a frame or chase encloses the die and holds the rules and blocks together.

In the case of a relatively complicated die it has been found to be impossible to cut the rule supporting blocks with sufficient accuracy to hold the rules against shifting relative to each other during a commercial operation. This occurrence results in a substantial loss to the carton manufacturer where the result of the shifting is in rules that form cooperatively related interlocking tabs, or creases for parts that must uniformly fold to certain positions. However, a skilled die maker, may, by careful cutting of the blocks and bending of the rules, and by carefully shimming the rules, produce a highly accurate die, but one that is incapable of actually performing a cutting and creasing operation without displacement of some of the rules. Also such a die is usually so delicately set up that a jar or an accidental striking of the projecting cutting and creasing edges of the rules may be sufficient to destroy its accuracy.

In the present invention, once a wooden furniture die has been made, and the rules have been shimmed to the highest accuracy, and is secured in a frame or chase, a mold that is complementary to the projecting portions of the rules, is made. Since the molding material will also cover the exposed surfaces of the blocks that are alongside the rules, and as the rules will tend to be held in the complementarily formed grooves in the mold, provision is made in the way of pins that will extend through the mold and to the wooden furniture die for tapping from the back of the mold to loosen or to separate the mold from the die. Once the mold is formed, removal of the die therefrom will result in destroying the die for re-use without re-assembling it.

In connection with the mold, the material thereof is preferably an epoxy compound having a suitable filler therein, and during the curing thereof a certain amount of heat is developed. The degree of heat and the length of the curing time are dependant largely upon the volume of the mass. The thicker the mold and the greater its area, the greater the heat developed during curing and the longer the curing time. Inasmuch as the metal rules break up the mass and are in direct heat exchange relation to the molding material, as are the metal pins, these will assist in the dissipation of the heat through conduction, but it is still desirable to reduce the thickness of the mold as much as possible without weakening the same, and to also insure against warpage of the mold during curing and to insure a flat base surface on the side of the mold that is opposite to the rule-formed grooves.

One of the objects of this invention is the provision of an improved method of making a mold that will not warp during curing and that has structure strengthening it so that the mold may be relatively thin, and which structure contributes to the dissipation of heat developed during curing, and which structure does not interfere with the presence and use of the separating pins, nor with the formation of the grooves in the mold.

Other objects and advantages will appear in the description and in the drawings.

In the drawings:
FIG. 1 is a top plan view of a wooden furniture die within a frame.
FIG. 2 is a cross sectional view of the die of FIG. 1, taken along line 2—2 of FIG. 1 but showing an outermost frame spaced outwardly of the inner frame of FIG. 1.
FIG. 3 is a sectional view similar to that of FIG. 2 but showing the plastic compound of the mold on the die, and showing the reinforcing material in the mold and a top plate on the mold for forming a flat upper surface on the latter.
FIG. 4 is a top plan view of the mold of FIG. 3 but with the top plate removed.
FIG. 5 is a vertical sectional view of a mold and die formed thereon.
FIG. 6 is a modified form of the invention shown in FIG. 3 in which a top plate is adhered to the plastic of the mold rather than being removable, and which plate performs the function of reinforcing the mold.

In detail, FIGS. 1 and 2 show the structure of a conventional wooden furniture die that is to constitute the "pattern" for a mold. The frame around the die, in the present instance, comprises metal rails 1, that are quite accurate in cross sectional contour, the latter being rectangular, as seen in FIG. 2.

Outside of rails 1 are spacing blocks or elements 2, and outside these elements is the chase or frame 3 (FIG. 2) that may tightly hold together all of the structure inside the chase by means of conventional quoins or wedges operative between the members of the frame and the upstanding sides of a stationary bed (not shown).

The die itself comprises wooden furniture blocks 4 that support the cutting and creasing rules 5. No distinction is made herein as to which are the cutting and which are the creasing rules, although the cutting rules are those that cut the outline of the blank, and that may cut certain tabs and the like within the outline of the blank, while the creasing rules merely crease the blank along folding lines along which portions of the blank are to be folded. Certain of the outermost cutting rules in a die of this kind are normally omitted in the die where such rules, in a plurality of corresponding dies, function to form part of the outline of an adjacent blank, or to complete cutting the blank to form outermost edges thereof.

In carrying out the present invention, the blocks 4, particularly in the larger areas that correspond in outline to the larger areas of the blank, such as the side and top and bottom walls of a carton, are formed with relatively shallow circular recesses 8. Each of these recesses is adapted to frictionally hold one end of a cylindrical pin 9 therein, with such pin projecting from the block a distance equal to the depth of the molding material. This distance is preferably at least equal to the distance that frame 3 projects from the blocks 4. The cutting and creasing edges of the rules and the rails 1 and frame 3 all project from the same side of the blocks 1, while their opposite edges and sides are coplanar, and are normally supported on a rigid bed.

The shimming of the rules preferably occurs after the pins are in the blocks so that the blocks and rules will not be disturbed by the steps of positioning the pins. In this connection it should be noted that adjustment of the blocks is in a lateral, and not a vertical direction when the die is substantially horizontally positioned; hence the pins may, if desired, be pushed vertically into the recesses after the shimming step. In either instance the pins will be supported at their lower ends, and cannot fall out of position or moved laterally relative to the blocks and rules.

Also, pins 10 may be supported on certain of the blocks, which pins will ultimately function to support the reinforcing material at the desired level. These pins 10 may terminate at their upper ends at a level below the upper ends of pins 9 and above the upper edges of the rules.

The exposed upper and lateral surfaces of the blocks, rails, rules and pins 9, 10 and the inside of frame 3 including its upper surfaces are coated with a parting medium, and the next step in the method is to pour the molding material 12 (FIG. 3) into the frame to cover all exposed surfaces above the blocks, including their upper surfaces to approximately the level of the upper ends of pins 10, at which time a sheet 13 of metal screen or hardwood cloth apertured at 14 (FIG. 4) for the pins 9 may be positioned on and supported by pins 10 spaced within the confines of the upwardly projected outline of the die. The molding material 12, which may be a suitably filled epoxy compound is then poured over sheet 13 to slightly above the upper level of the upper ends of pins 9.

A plate 17 (FIG. 3) is then positioned over the upper side of the mold and this plate may be weighted, if desired, to settle it against the upper surfaces of pins 9, forming a flat surface for the mold. This plate is coated with a parting medium so it will freely separate from the molding material. Any excess of said material will normally be squeezed out to pass over frame 3.

By the above steps, it will be seen that the mold will be formed without danger to the rules and blocks, and upon curing, the mold will be well reinforced by the sheet 13 which will extend over the major portion of the die, including the rules, but without interfering with the rules or rails 1.

The openings 14 in the sheet 13 are sufficiently large to enable positioning the screen in place without engaging pins 9. Also it should be noted that pins 10 may not be necessary where the viscosity of the plastic material and its pot life are such that it will stay suspended in position spaced above the rules and rails.

As an alternative to the screen or sheet 13, after the plastic material is poured into frame 3 to slightly above the level of the upper surfaces of pins 9 (without sheet 13) a plywood or other suitable rigid panel 20 (FIG. 6) may be positioned on the plastic material and urged downwardly against the upper surfaces of pins 9. This panel is formed with relatively small passageways 21 that are in register with pins 9, and other larger open ended passageways 22 that are at several different positions over the body of plastic material. The panel is not coated with a parting wax, or medium, hence when it contacts the epoxy compound, the latter will tightly adhere thereto. Surplus plastic will flow into passageways 22 creating bonds therein with the panel. Thus the panel forms the reinforcing material, and also provides a flat base for the mold when it is inverted.

After the body of plastic material in FIG. 4 is cured, the mold may be quickly separated from the die by tapping on the exposed upper ends of pins 9, or in the case of FIG. 6, a nail or other pin may be thrust into each of the passageways 21 to engage the pins 9 and when tapped, the blows will be transmitted to the die for separating the die from the mold. Obviously the pins that extend into passageways 21 may be positioned therein and coated with a parting medium to prevent any of the plastic material entering the passageways 21 or sticking to the pins, or the passageways may be coated with the parting medium.

In FIG. 5, the mold, after being formed, is shown supporting rails 1 and with the rules inserted in the grooves of the mold, preparatory to pouring the molding material into the mold for forming the die.

The pins 15 in the mold of FIG. 5 have been substituted for the slightly longer pins of FIG. 2 so their surfaces will be flush with the surfaces of the mold.

In forming the die, the projecting portions of the rules, the exposed upper surfaces of the pins 15 and the rails have a parting medium applied thereto before the die material is poured.

After the die material, which is also preferably an epoxy compound, is cured, the die may readily be separated from the mold by tapping on the exposed surfaces of the pins 15 that are at the side of the mold opposite to the die.

It may also be noted, that in this form of the invention, the epoxy compound is in tight, heat transfer relation with the lower metal surface of plate 17, which structure will facilitate the relatively rapid dissipation of the heat of reaction or exothermic heat developed in the plastic during curing thereof, and rails 1 are preferably of aluminum, which also contributes to the accomplishment of this desirable result.

The molding material does not warp or expand and the rigid plate materially contributes to holding molding material 12 that is tightly adhered thereto against warpage during curing, nor does it shrink to any noticeable degree. The rules will stay rigidly in place in the mold of FIG. 5 being tightly but releasably held in the mold.

It is to be understood that the detailed description is not intended to be restrictive of the invention, but is descriptive of a preferred form thereof.

I claim:

1. The method of making a blank forming die comprising the steps of: making a conventional blank forming die as a pattern, and which die includes the conventional steel rules having working edges and having individual, separate blocks between and against said rules supporting the latter in positions with their working edges projecting from a side of said blocks for engagement with a sheet of material for forming said blank therefrom, and with their base edges that are opposite to said working edges coplanar; pouring a body of flowable, self-hardening material onto the sides of said blocks from which said working edges project to a uniform depth greater than the distance said working edges project from said side of said blocks, then and while said body is flowable, tightly and substantially inseparably securing the side of said body that is opposite to said blocks to a rigid, preformed, flat panel with said panel in a plane parallel to that of said working edges; then permitting said body to harden; then removing said body and said panel as a unit therewith from said blocks and from the projecting portions of said rules, whereby said body will form a mold having grooves therein corresponding to the arrangement of the rules in said pattern; then inserting the working edges of rules corresponding to those in said pattern into said grooves and thereafter pouring a body of self-hardening plastic onto the side of said mold from which said rules project to a level approximately equal to the plane in which said base edges are positioned and confining said last mentioned body to within the outline of the outwardly projected area of said one side of said mold, and finally permitting said last mentioned body to harden and removing it including said rules from said mold.

2. The method of making a mold for a blank forming die comprising the steps of: making a pattern conforming to a flat-bed blank forming die including the conventional steel rules having working edges and having blocks between and against said rules supporting the latter in positions with their working edges projecting from a side of said blocks for engagement with a sheet of material for forming said blank therefrom and with their base edges that are opposite to said working edges coplanar; holding said blocks and rules together for maintaining said rules rigid relative to each other and to said blocks by positioning a frame around said pattern having inside surfaces facing and against the latter; then covering said pattern including the projecting working edges of said rules with a body of flowable, self-hardening plastic material having the characteristic of being substantially stable against shrinkage and expansion upon hardening; pressing a rigid preformed flat panel against the surface of said body of plastic that is opposite to the side that is against said pattern in a position parallel with the plane in which said base edges of said rules are positioned while said body of plastic material is in a plastic condition and substantially inseparably securing said panel against said surface of said body; then permitting said body of plastic material to harden; then separating said body of plastic material and said rigid panel as a unit from said pattern and frame to provide a mold having grooves formed therein complementary to the projecting portions of said rules and frame into which grooves the working edges of the rules in the die to be formed are adapted to be held during the casting of the die.

3. The method of making a die adapted for use in a flat bed press comprising the steps of; making a pattern conforming to a flat bed blank-forming die including the conventional steel rules having working edges and blocks between and against said rules supporting them in positions with their working edges projecting from one side of said blocks for forming said blank and with their base edges opposite to said working edges coplanar; holding said blocks and rules together for maintaining said rules rigid relative to each other and to said blocks by positioning a frame around said pattern having inside surfaces facing and against the latter defining the exact outer outline of the die to be formed and projecting to the same side of said blocks as said working edges; then covering said pattern including the projecting working edges of said rules and the projecting portion of said frame with a flowable self-hardening material having the characteristic of being stable against shrinkage, expansion and distortion upon hardening; permitting said material to harden; then separating said material from said pattern and frame to provide a mold having grooves and recesses formed therein complementary to the projecting portions of said rules and frame; then inserting a frame and rules corresponding to those of said pattern into said recesses and grooves respectively with the base edges of said rules uppermost and coplanar; then coating the inside surfaces of the frames and the exposed surfaces of the rules and mold enclosed within the frame by a parting medium; then filling said frame and the spaces between said rules to the level of the base edges of the latter including sections extending across the planes in which said rules are respectively disposed with a flowable self-hardening material having generally the said characteristics of the aforesaid material of said mold and permitting it to harden thereby forming a substantially unitary die body within said frame having rules therein separable therefrom to enable re-ruling; and finally separating said die body and said rules from said mold and frame.

4. The method of making a mold for a die to be used in forming cardboard blanks from sheet material comprising the steps of: making a pattern conforming to a conventional flat bed blank forming die including steel rules having working edges and blocks supporting said rules in positions with said working edges projecting from one side of said blocks for forming such blank, holding said blocks and rules together for maintaining said rules rigid relative to each other and to said blocks by positioning a frame around said pattern having inside surfaces facing the latter and defining the exact outer outline of the die to be formed and projecting from the same side of said blocks as the working edges of said rules, then covering said pattern including the projecting working edges of said rules and the projecting portion of said frame with a self-hardening plastic material having the characteristic of being substantially stable against shrinkage, expansion and distortion upon hardening; permitting said plastic material to harden; then separating said plastic material from said pattern, rules and frame to provide a mold having grooves and recesses formed therein complementary to the projecting portions of said rules and frame.

5. The method of making a mold for a die to be used in forming cardboard blanks from sheet material comprising the steps of:

(a) making a pattern consisting of conventional wooden furniture die that includes steel blank forming rules having working edges and wooden blocks supporting said rules in positions with said working edges projecting from one side of said blocks and with the base edges of said rules coplanar with the opposite sides of said blocks and which rules when so supplied have their working edges conforming to the outlines of the cuts and creases of said blanks to be formed;

(b) holding said rules and blocks rigidly together against movement relative to each other by positioning around said pattern a frame having an inside surface facing and against said pattern and at right angles to the plane in which said base edges are positioned and defining the exact outline of the die to be formed and projecting from said one side of said blocks as the said working edges of said rules;

(c) supporting said pattern and frame horizontal and covering said pattern including the projecting working edges of said rules and the projecting portions of said frame with a body of flowable self-hardening plastic material;

(d) positioning a horizontal rigid, pre-formed flat panel on said body in a position with the uppermost surface of said panel parallel with the plane in which said base edges of said rules are positioned and (e) inseparably and rigidly securing the lower surface of said panel against said body and spaced from said working edges of said rules and from said frame;

(f) permitting said body to harden and then removing said body and said panel, as a unit, from said frame and from said rules.

References Cited in the file of this patent

UNITED STATES PATENTS

| | | |
|---|---|---|
| 2,263,001 | Gunsaulus et al. | Nov. 18, 1941 |
| 2,625,710 | Lockwood | Jan. 20, 1953 |
| 2,632,922 | Kish | Mar. 31, 1953 |
| 2,724,868 | Kish | Nov. 29, 1955 |
| 2,826,968 | Phillips | Mar. 18, 1958 |
| 2,869,179 | Hartesveldt | Jan. 20, 1959 |
| 2,885,933 | Phillips | May 12, 1959 |
| 2,915,789 | Dykstra et al. | Dec. 8, 1959 |
| 2,981,330 | Stickney et al. | Apr. 25, 1961 |